United States Patent
Moon et al.

(10) Patent No.: US 8,705,475 B2
(45) Date of Patent: Apr. 22, 2014

(54) SCHEDULING APPARATUS CONSIDERING QUALITY OF SERVICE (QOS)

(75) Inventors: Jung Mo Moon, Daejeon (KR); Ho Choong Cho, Daejeon (KR); Sang Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 157 days.

(21) Appl. No.: 13/327,050

(22) Filed: Dec. 15, 2011

(65) Prior Publication Data

US 2012/0155363 A1 Jun. 21, 2012

(30) Foreign Application Priority Data

Dec. 15, 2010 (KR) ........................ 10-2010-0128377

(51) Int. Cl.
*H04W 4/00* (2009.01)
(52) U.S. Cl.
USPC .......................................... 370/329; 370/468
(58) Field of Classification Search
USPC ................... 370/229–234, 329, 341, 468; 455/450–453, 509, 512, 513
See application file for complete search history.

(56) References Cited

U.S. PATENT DOCUMENTS

| 6,850,540 | B1 * | 2/2005 | Peisa et al. ..................... 370/468 |
| 2006/0274690 | A1 * | 12/2006 | Chun et al. ..................... 370/329 |
| 2009/0147717 | A1 | 6/2009 | Cai |
| 2012/0044851 | A1 * | 2/2012 | Wang et al. ..................... 370/312 |
| 2012/0093070 | A1 * | 4/2012 | Huang et al. ..................... 370/315 |

FOREIGN PATENT DOCUMENTS

WO WO 2010/124415 * 4/2010

* cited by examiner

*Primary Examiner* — Kerri Rose
(74) *Attorney, Agent, or Firm* — Nelson Mullins Riley & Scarborough LLP; Anthony A. Laurentano, Esq.; Lewis Lee, Esq.

(57) ABSTRACT

Disclosed is an efficient scheduling apparatus and method for multi-cell transmission in evolved node bases (eNBs). An eNB scheduling for a multi-cell transmission service may allocate wireless resources based on a priority level, a minimum guaranteed bit rate, and a maximum bit rate. That is, a subframe may be efficiently used by minimizing the number of subframes allocated to a single session while satisfying a quality of service (QoS).

20 Claims, 6 Drawing Sheets

SCHEDULING APPARATUS CONSIDERING QUALITY OF SERVICE (QOS)

CROSS-REFERENCE TO RELATED APPLICATIONS

This application claims priority under 35 U.S.C. §119 to Korean Patent Application No. 10-2010-0128377, filed on Dec. 15, 2010, in the Korean Intellectual Property Office, the disclosure of which is incorporated herein by reference in its entirety.

TECHNICAL FIELD

The present invention relates to an efficient scheduling apparatus and method for multi-cell transmission in evolved node bases (eNBs), and more particularly, to an efficient scheduling apparatus and method for multi-cell transmission in eNBs that may minimize the number of subframes allocated to a single session, while satisfying a quality of service (QoS), by allocating wireless resources based on a priority level, a minimum guaranteed bit rate, and a maximum bit rate, and thereby efficiently use a subframe.

BACKGROUND

A mobile communication system can provide a broadcasting service using a single frequency network transmission. For this, all of evolved node bases (eNBs) belonging to a corresponding service area need to transmit the same data to a wireless section at the same time. Therefore, each eNB needs to use the same scheduling algorithm for synchronized transmission. Also, an eNB needs to receive the same description of a packet from an upper node prior to wirelessly transmitting data. The 3rd Generation Partnership Project (3GPP) defines a SYNC protocol which provides content synchronization on a radio interface. The SYNC protocol is defined between eNB(s) and broadcast multicast service center (BM-SC). The eNB performs synchronized scheduling using the SYNC protocol. The SYNC protocol includes a timestamp about an absolute time to be transmitted in a single scheduling period (multimedia broadcast multicast service (MBMS) scheduling period (MSP)), a packet number, and the total number of transmitted octets.

The eNB performs synchronized scheduling with respect to an Internet Protocol (IP) using information included in the SYNC protocol. In general, the eNB schedules an amount of wireless resources to be allocated to a subframe in the consideration of an amount of packets received for each service, a delay factor, and the like, based on a unit of 1 msec that is a subframe unit. For the synchronized transmission, all of the eNBs receive broadcasting data and then schedule packet data for a broadcasting service based on a unit of timestamp interval. That is, the eNB matches a loss and an order of a packet using an SYNC protocol field and then, performs scheduling with respect to a buffered packet until a subsequent MSP. For multi-cell transmission, the eNB schedules the buffered packet for every multicast traffic channel (MTCH) based on an MSP unit, and allocates resources based on a subframe unit.

The MSP is a scheduling period for multi-cell transmission. The eNB performs scheduling based on an MSP unit and indicates a scheduling result in MBMS scheduling information (MSI). In general, the eNB performs scheduling based on only a priority level by a service list order that is provided from a multi-cell/multicast coordinate entity (MCE). Accordingly, there are some constraints in scheduling without considering a priority level associated with a QoS, a transmission rate, and the like.

SUMMARY

An exemplary embodiment of the present invention provides a scheduling apparatus considering a quality of service (QoS), the apparatus including: a receiving module to receive a QoS parameter including at least one of a priority level, a multimedia broadcast multicast service (MBMS) E-RAB guaranteed bit rate downlink, and an MBMS E-RAB maximum bit rate downlink with respect to logical channel identifiers (LCIDs) from a multi-cell/multicast coordinate entity (MCE), and to receive a packet of the LCIDs from a radio link control (RLC) based on an MBMS scheduling period (MSP) unit; a first allocation unit to sequentially allocate, to subframes, packets of a LCID not checked for a guaranteed bit rate (GBR) allocation, among the LCIDs having the MBMS E-RAB guaranteed bit rate downlink; a first schedule module including a first check unit to check the GBR allocation with respect to the LCID allocated by the first allocation unit; and an MBMS scheduling information (MSI) generation module to generate MSI from the subframe allocated with the LCID and the packets of the LCID.

The scheduling apparatus may further include: a second allocation unit to sequentially allocate, to N subframes not allocated by the first allocation unit, packets of a LCID not checked for a maximum bit rate (MBR) allocation, among the LCIDs all checked for the GBR allocation and having the MBMS E-RAB maximum bit rate downlink; and a second schedule module including a second check unit to check the MBR allocation with respect to the LCID allocated by the second allocation unit. The MSI generation module may generate MSI from the subframe allocated with the LCID and the packets of the LCID at the first allocation unit, and the subframe allocated with the LCID and the packets of the LCID at the second allocation unit.

The scheduling apparatus may further include: a third allocation unit to sequentially allocate, to a subframe not allocated by the second allocation unit, packets of a LCID not checked for a final allocation, among the LCIDs all checked for GBR allocation and the MBR allocation; and a third schedule module including a third check unit to check the final allocation with respect to the LCID allocated by the third allocation unit. The MSI generation module may generate MSI from the subframe allocated with the LCID and the packets of the LCID at the first allocation unit, the subframe allocated with the LCID and the packets of the LCID at the second allocation unit, and the subframe allocated with the LCID and the packets of the third LCID at the third allocation unit.

Another exemplary embodiment of the present invention provides a scheduling method considering a QoS, including: (a) receiving a QoS parameter including at least one of a priority level, an MBMS E-RAB guaranteed bit rate downlink, and an MBMS E-RAB maximum bit rate downlink with respect to LCIDs from an MCE; (b) receiving packets of the LCIDs from an RLC based on an MSP unit; (c) sequentially allocating, to subframes, a packet of a first LCID not checked for a GBR allocation, among the LCIDs having the MBMS E-RAB guaranteed bit rate downlink; (d) checking the GBR allocation with respect to the allocated LCID; and (e) generating MSI from the subframe allocated with the LCID and the packets of the LCID at the first allocation unit.

The scheduling method may further include: (f) sequentially allocating, to N subframes not allocated in step (c), a packet of a LCID not checked for an MBR allocation, among the LCIDs all checked for the GBR allocation and having the MBMS E-RAB maximum bit rate downlink at the second allocation unit; and (g) checking the MBR allocation with respect to the LCID allocated in step (f). Step (e) may generate MSI from the subframe allocated with the LCID and the packets of the LCID at the first allocation unit, and the subframe allocated with the LCID and the packet of the LCID at the second allocation unit.

The scheduling method may further include: (h) sequentially allocating, to a subframe not allocated in step (f), a packet of a LCID not checked a final allocation, among the LCIDs all checked for the GBR allocation and the MBR allocation at the third allocation unit; and (i) checking the final allocation with respect to the LCID allocated in step (h). Step (e) may generate MSI from the subframe allocated with the LCID and the packets of the LCID at the first allocation unit, the subframe allocated with the LCID and the packets of the LCID at the second allocation unit, and the subframe allocated with the LCID and the packets of the LCID at the third allocation unit.

Other features and aspects will be apparent from the following detailed description, the drawings, and the claims.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
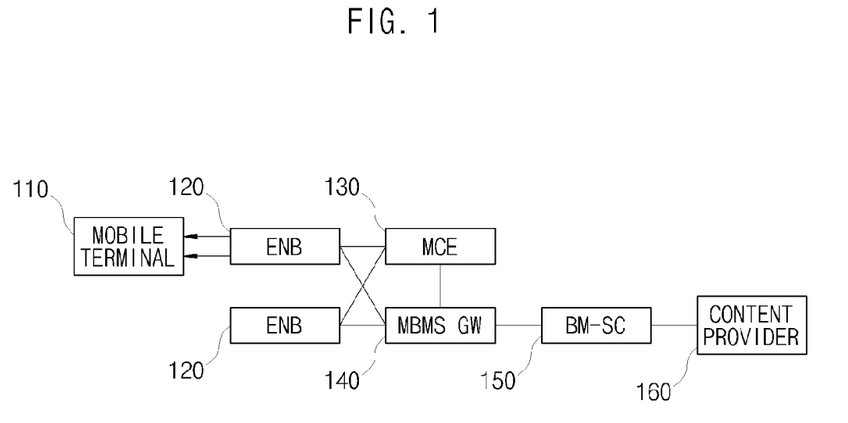
FIG. 1 is a diagram illustrating a structure of a mobile communication network for a multicast broadcast single frequency network (MBSFN) for providing a broadcasting service in a mobile communication network.

Referring to FIG. 1, a mobile communication network for a multicast broadcast single frequency network (MBSFN) for providing a broadcasting service in a mobile communication network to be applied with the present invention includes a mobile terminal 110, an evolved node base (eNB) 120, a multi-cell/multicast coordinate entity (MCE) 130, a multimedia broadcast multicast service gateway (MBMS-GW) 140, a broadcast multicast service center (BM-SC) 150, and a content provider 160.

The mobile terminal 110 receives a broadcasting service.

The eNB 120 provides a point-to-multipoint service.

The MCE 130 transmits the same scheduling information to all of eNBs in a MBSFN area 120. Also, the MCE 130 transmits an allocation and retention priority associated with a quality of service (QoS) of a session (hereinafter, referred to as "allocation and retention priority") and a guaranteed bit rate (GBR) QoS information parameter to the eNB 120. The allocation and retention priority includes a priority level indicating a priority of the session, a pre-emption capability associated with pre-emption, and pre-emption vulnerability. GBR QoS information includes a MBMS E-RAB maximum bit rate downlink indicating a maximum transmission amount and an MBMS E-RAB guaranteed bit rate downlink indicating a minimum guaranteed transmission amount.

The MBMS-GW 140 transmits MBSFN traffic to at all of eNBs in a MBSFN area.

The BM-SC 150 controls an MBMS session and transmits broadcasting data including a SYNC 260 protocol.

The content provider 160 provides broadcasting contents.

Figure 2:
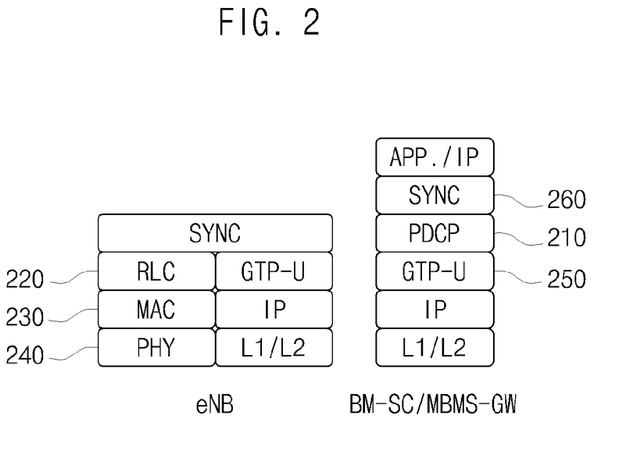
FIG. 2 is a diagram illustrating a configuration of a protocol for processing user data for a broadcasting service.

Referring to FIG. 2, a protocol reference module of a user plane for processing user data for a broadcasting service according to the present invention includes a packet data convergence protocol (PDCP) 210, a radio link control (RLC) 220, a media access control (MAC) 230, a physical layer (PHY) 240, a general packet radio service (GPRS) core network (GTP-U) 250, and a SYNC 260.

The PDCP 210 is positioned in the BM-SC 150 and performs Radio Bearer Id (RBId) (hereinafter, mapping a session by 1:1) mapping and compressing with respect to a packet.

The RLC 220 performs a fragmentation and concatenation function with respect to the packet.

The MAC 230 performs scheduling, multiplexing, and demultiplexing with respect to the packet.

The PHY 240 is positioned in the eNB 120 and controls a modem.

The SYNC 260 protocol includes a timestamp that is an absolute time when a broadcasting packet (RLC PDU) needs to be transmitted in a wireless section within a scheduling period, a packet number, and the total number of transmitted octets.

The GTP-U 250 is positioned between the MBMS-GW 140 and the eNB 120, and performs a function of transferring a PDCP 210 PDU generated by the BM-SC 150 to the RLC 220 of the eNB 120.

The broadcasting packet received from the BM-SC 150 may be used to estimate orders of packets, a size of a packet lost while being transmitted, and the like, using a packet number and the total number of octets for each timestamp. The packets generated as above are transmitted from the BM-SC 150 to the eNB 120. A packet received via the GTP-U 250 needs to be buffered at timestamp intervals of the SYNC 260 protocol and then transmitted to the RLC 220. Therefore, a large amount of data is transmitted every timestamp period.

Figure 3:
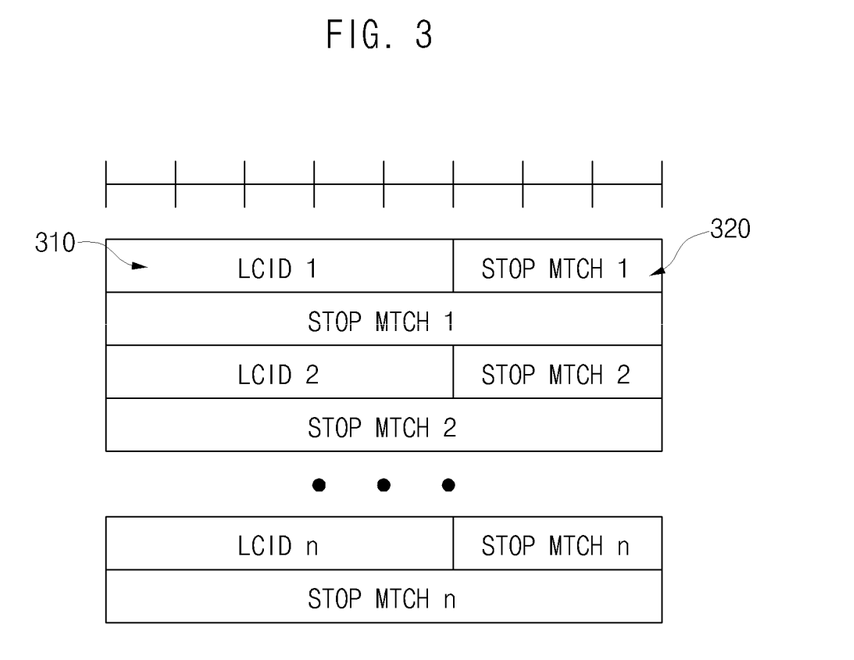
FIG. 3 is a diagram illustrating a configuration of multimedia broadcast multicast service (MBMS) scheduling information (MSI)

Referring to FIG. 3, a configuration of MBS scheduling information (MSI) includes a logical channel ID (LCID) 310 and a StopMTCH 320 as a MAC control element (CE) indicating scheduling information about each session (LCID 310) of a MBMS scheduling period (MSP) 410 section.

According to the present invention, the LCID 310 may appear at least once within a single MSI.

Figure 4:
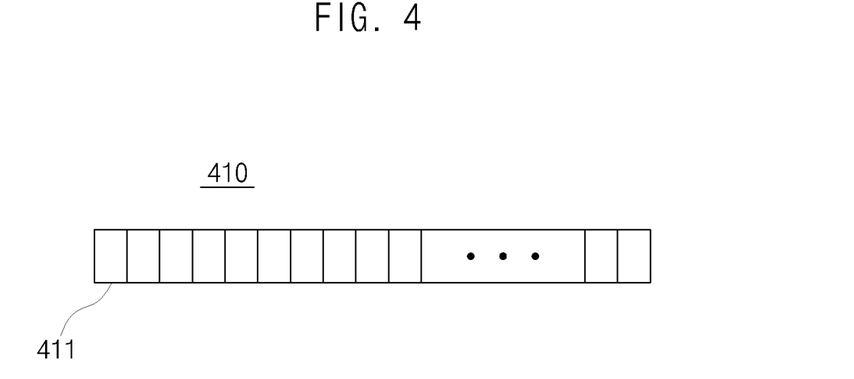
FIG. 4 is a diagram illustrating a configuration of an MBMS scheduling period (MSP)

Referring to FIG. 4, the MSP 410 includes at least one subframe 411 as a scheduling period for multi-cell transmission.

Figure 5:
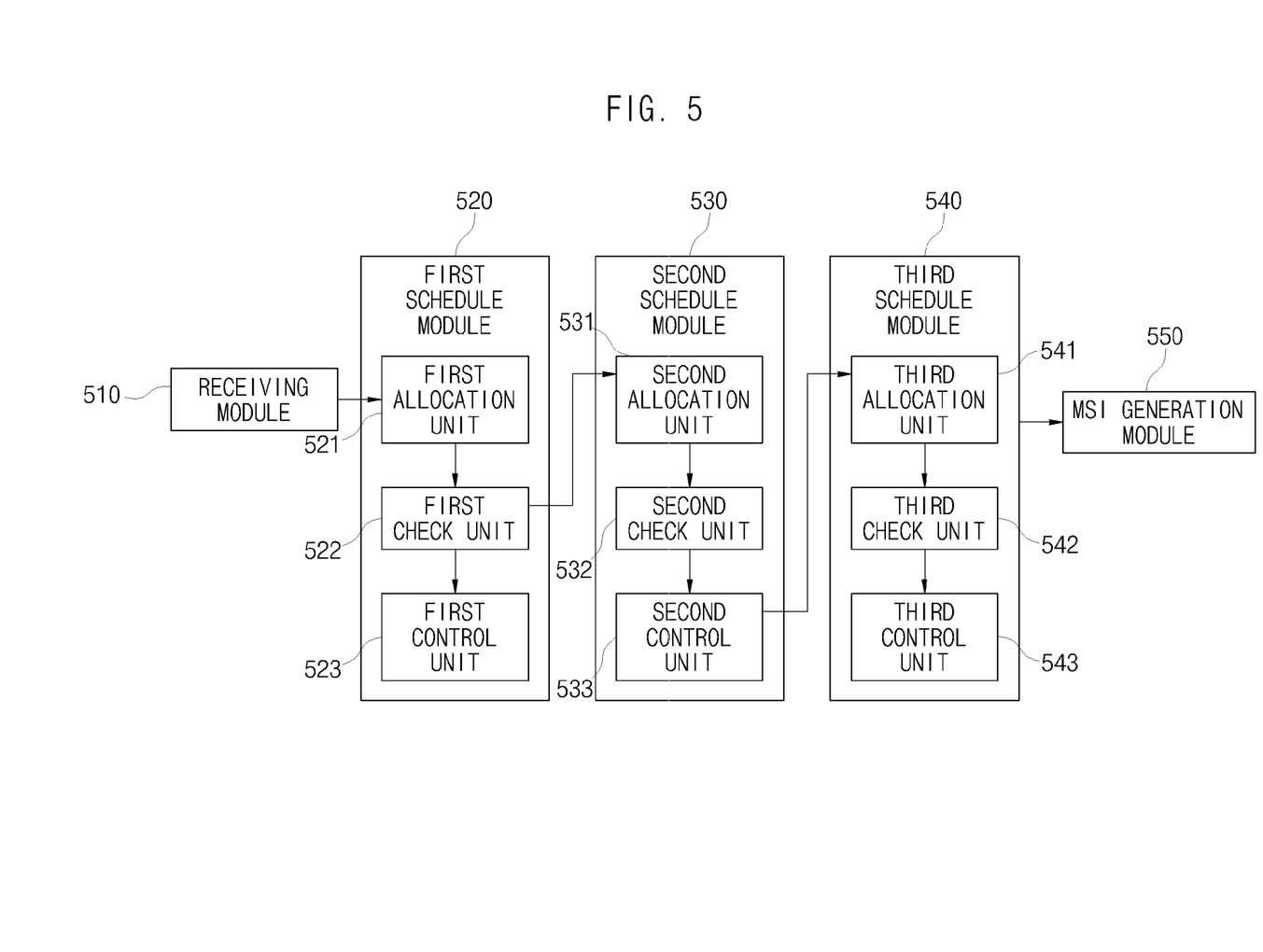
FIG. 5 is a diagram illustrating a configuration of a scheduling apparatus for a multi-cell transmission.

The eNB 120 performs scheduling based on an MSP unit for transmission to a wireless section, and indicates a scheduling result in MSI. The MSP 410 exists independently for each MBSFN area FIG. 5 shows a receiving module 510, a first schedule module 520, a second schedule module 530, a third schedule module 540, and an MSI generation module 550, as a configuration about a scheduling apparatus for multi-cell transmission.

The receiving module 510 receives a QoS parameter including at least one of a priority level, an MBMS E-RAB guaranteed bit rate downlink, and an MBMS E-RAB maximum bit rate downlink with respect to LCIDs from the MCE 130, and receives packets of the LCIDs from the RLC 220 based on an MSP unit. The MBMS E-RAB maximum bit rate downlink and the MBMS E-RAB guaranteed bit rate downlink calculates a transmission amount based on each second unit. Schematic flow shaping about each session is performed in the BM-SC 150 and the eNB 120 supports second-unit flow shaping.

The first schedule module 520 includes a first allocation unit 521, a first check unit 522, and a first control unit 523.

The eNB 120 schedules packets that is received from the RLC 220 based on the MSP unit.

The first allocation unit 521 sequentially allocates, to a subframe, packets of LCIDs not checked for a guaranteed bit rate (GBR) allocation, among the LCIDs having the MBMS E-RAB guaranteed bit rate downlink at the first allocation unit. The first allocation unit 521 determines whether the LCID having the MBMS E-RAB guaranteed bit rate downlink and not allocated by the first allocation unit 521 exists among packets received from the RLC 220, and allocates the packets of the corresponding LCID to the subframe when the LCID exists. Whether the allocation is performed by the first allocation unit 521 may be verified based on whether the GBR allocation is checked. The first allocation unit 521 may initially allocate, to the subframe, the packets of the LCID not checked for the GBR allocation and having a high priority level among the LCIDs having the MBMS E-RAB guaranteed bit rate downlink.

The first control unit 523 may cancel an allocation of a last subframe among subframes allocated with the packets of the first LCID.

When the number of packet bits of the LCID allocated to the subframe is less than a transport block (TB) of the subframe, the first control unit 523 does not allocate the packets of the LCID to the subframe. When the number of bits of the packet occupying the allocated subframe is less than the TB of the subframe, the first control unit 523 may cancel the allocation of the corresponding subframe. That is, when the scheduled packets do not occupy the whole allocated subframe, the first control unit 523 may cancel the allocation of the corresponding subframe for the transmission efficiency.

The first check unit 522 checks the GBR allocation with respect to the LCID allocated by the first allocation unit 523. Whether scheduling is completed in the first schedule module 520 may be verified based on whether the GBR allocation is checked.

The MSI generation module 550 generates MSI from the subframe allocated with the LCID and the packets of the LCID at the first allocation unit. The MSI may be configured as an LCID and a StopMTCH tuple list, as session scheduling information about an MSP section.

The second schedule module 530 includes a second allocation unit 531, a second check unit 532, and a second control unit 533.

The second allocation unit 531 sequentially allocates, to N subframes not allocated by the first allocation unit 521, a packet of a LCID not checked for a maximum bit rate (MBR) allocation, among the LCIDs all checked for the GBR allocation and having the MBMS E-RAB maximum bit rate downlink. That is, the second allocation unit 531 allocates, to N subframes from first to N-th subframes, the packets of the LCID not allocated by the second allocation unit 531 among the LCIDs of which scheduling is completed in the first schedule module 520 and having the MBMS E-RAB maximum bit rate downlink. Whether the allocation is performed by the second allocation unit 531 may be verified based on whether the MBR allocation is checked. The second allocation unit 531 may initially allocate, to N subframes, the packets of the LCID not checked for the MBR allocation and having a high priority level, among the LCIDs all checked for the GBR allocation and having the MBMS E-RAB maximum bit rate downlink.

The second control unit 533 cancels an allocation of an N-th subframe among the N subframes when a sum of the number of bits of (N-1)-th packets of the second LCID allocated by the second allocation unit 531 and the number of packet bits of the first LCID that is allocated by the first allocation unit 521 exceeds the MBMS E-RAB maximum bit rate downlink of the LCID. The second control unit 533 cancels the allocation of the N-th subframe and allocates (N-1) subframes from the first to (N-1)-th subframes. That is, for each LCID, when a sum of the number of packet bits allocated by the first allocation unit 521 and the number of packet bits allocated to the first to the (N-1)-th subframes by the second allocation unit 531 exceeds the MBMS E-RAB maximum bit rate downlink of the LCID, the second control unit 533 cancels the allocation of the N-th subframe.

The second check unit 532 checks the MBR allocation with respect to the LCID allocated by the second allocation unit 531. Whether scheduling is completed in the second schedule module 530 may be verified based on whether the MBR allocation is checked.

Here, the MSI generation module 550 generates MSI from the subframe allocated with the LCID and the packets of the LCID at the first allocation unit, and the subframe allocated with the LCID and the packets of the second LCID at the second allocation unit.

The third schedule module 540 includes a third allocation unit 541, a third check unit 542, and a third control unit 543.

The third allocation unit 541 sequentially allocates, to subframes not allocated by the second allocation unit 531, packets of a LCID not checked for a final allocation, among the LCIDs all checked for the GBR allocation and the MBR allocation. After the allocation is completed in the first allocation unit 521 and the second allocation unit 531, the third allocation unit 541 allocates the subframes with respect to LCID packets not scheduled by the third allocation unit 541. Whether scheduling is performed in the third allocation unit 541 may be verified based on whether the final allocation is checked. That is, after scheduling is completed in the first schedule module 520 and the second schedule module 530, scheduling is performed with respect to the LCID having not scheduled packets. The third allocation unit 541 initially allocates, to the subframe, the packet of the LCID not checked for the final allocation and having a high priority level, among the LCIDs all checked for the GBR allocation and the MBR allocation.

The third check unit 542 checks the final allocation with respect to the third LCID allocated by the third allocation unit 541.

The third control unit 543 cancels an allocation of the last subframe when the LCID is allocated last by the third allocation unit 541, and a value obtained by dividing the number of bits of the last subframe, among subframes allocated with the packets of the LCID, by a TB of the last subframe is less than a threshold value. The third control unit 543 determines whether the LCID is the last allocated subframe, and divides the number of bits of the packet occupying the last subframe of the last allocated LCID by the TB of the subframe. In this instance, when the division value is less than the threshold value, the third control unit 543 cancels the allocation of the last allocated subframe. That is, when (number of bits allocated in the scheduled last subframe/TB size of the subframe) <α (here, 0<α<1), the third control unit 543 cancels the allocation of the last subframe. A value of α as above may be arbitrarily predetermined by an operator and the efficiency increases according to an increase in the value of α.

The packets of the LCID allocated to the cancelled subframe are initially allocated in a subsequent MSP. A subframe not used in the MSP may be used for unicast transmission.

Here, the MSI generation module 550 generates MSI from the subframe allocated with the LCID and the packets of the LCID at the first allocation unit, the subframe allocated with the LCID and the packets of the LCID at the second allocation unit, and the subframe allocated with the LCID and the packet of the LCID at the third allocation unit.

Figure 6A:
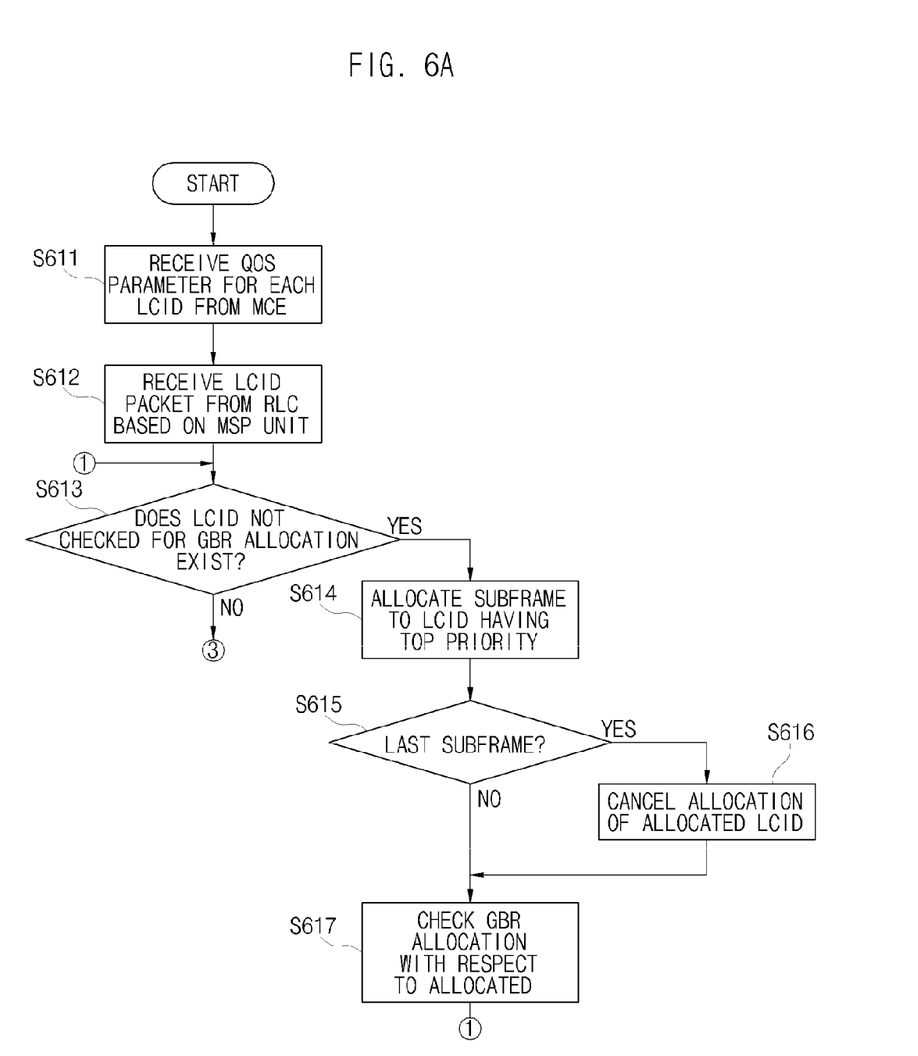
FIGS. 6A, 6B, and 6C are flowcharts illustrating a schedule for a multi-cell transmission.
Figure 6B:
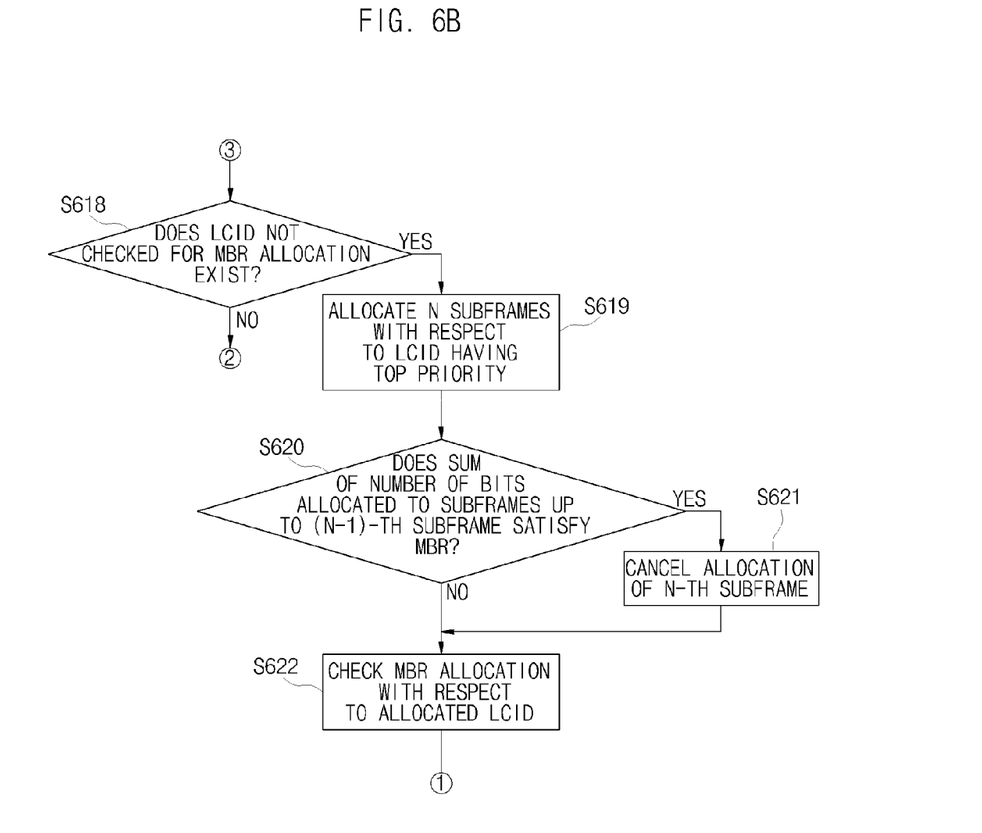
Figure 6C:
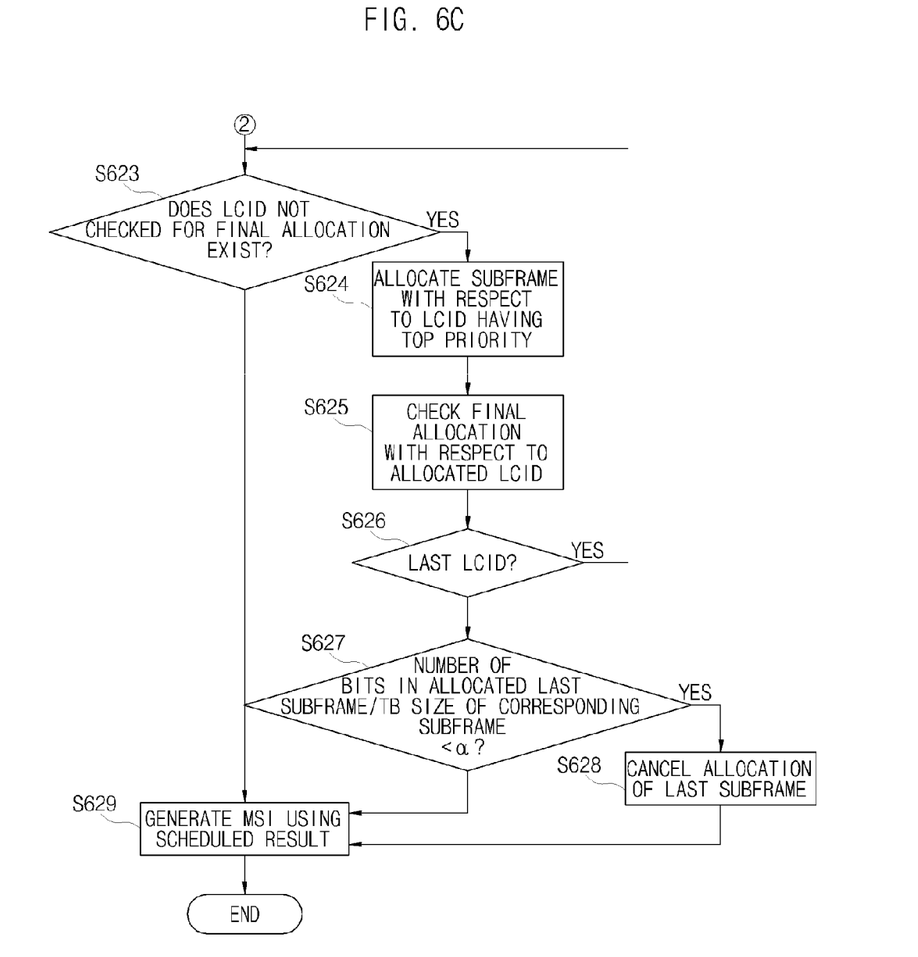

FIGS. 6A, 6B, and 6C relate to a scheduling method for multi-cell transmission. Initially, a QoS parameter including at least one of a priority level, an MBMS E-RAB guaranteed bit rate downlink, and an MBMS E-RAB maximum bit rate downlink with respect to LCIDs is received from the MCE 130 (S611). The MBMS E-RAB maximum bit rate downlink and the MBMS E-RAB guaranteed bit rate downlink calculate a transmission amount based on each second unit. Schematic flow shaping about each session is performed in the BM-SC 150 and the eNB 120 supports second-unit flow shaping.

Next, packets of the LCIDs are received from the RLC 220 based on an MSP unit (S612).

Next, whether packets of a LCID not checked for a GBR allocation exist among the LCIDs having the MBMS E-RAB guaranteed bit rate downlink is determined at first allocation unit (S613).

Next, among the LCIDs having the MBMS E-RAB guaranteed bit rate downlink, the packets of the LCID not checked for the GBR allocation are sequentially allocated to subframe(s) (S614). Among packets received from the RLC 220, the packets of the LCID having the MBMS E-RAB guaranteed bit rate downlink and not allocated LCID in step S614 is sequentially allocated to the subframe. Whether the allocation is performed in step S614 may be verified based on whether the GBR allocation is checked. Among the LCIDs having the MBMS E-RAB guaranteed bit rate downlink, the packet of the LCID not checked for the GBR allocation and having a high priority level is initially allocated to the subframes.

Whether the packets of the LCID are a last subframe among allocated subframes is determined at first allocation unit (S615).

When the packets of the LCID are allocated to the last subframe, a packet allocation of the LCID is cancelled (S616).

Here, whether the number of packets bits of the first LCID allocated to the subframe is less than a TB of the subframe is determined. When the number of packet bits of the LCID allocated to the subframe is less than the TB of the subframe, the packet of the first LCID may not be allocated to the subframe. That is, when the packets do not occupy the whole allocated subframe, the allocation of the corresponding subframe may be cancelled for the transmission efficiency.

Next, the GBR allocation is checked with respect to the allocated LCID (S617). Whether scheduling by step S614 is completed may be verified based on whether the GBR allocation is checked.

Next, MSI is generated from the subframes allocated with the LCIDs and the packets of the LCIDs (S629). The MSI may be configured as an LCID and a StopMTCH tuple list as session scheduling information about an MSP section.

Next, whether packets of LCIDs not checked for an MBR allocation exists among the LCIDs all checked for the GBR allocation and having the MBMS E-RAB maximum bit rate downlink is determined (S618) at second allocation unit.

Next, among the LCIDs all checked for the GBR allocation and having the MBMS E-RAB maximum bit rate downlink, the packets of the LCID not checked for the MBR allocation is sequentially allocated to N subframes not allocated in step S614 (S619).

N subframes from first to N-th subframes are allocated with respect to the packets of the LCID not allocated in step S619 among the LCIDs of which scheduling is completed in step S614 and having the MBMS E-RAB maximum bit rate downlink. Whether the allocation is performed in step S619 may be verified based on whether the MBR allocation is checked. Among the LCIDs all checked for the GBR allocation and having the MBMS E-RAB maximum bit rate downlink, the packets of the LCID not checked for the MBR allocation and having a high priority level is initially allocated to the N subframes.

Next, whether a sum of the number of bits of (N−1)th packets of the LCID allocated in step S619 and the number of packet bits of the LCID allocated in step S614 exceeds the MBMS E-RAB maximum bit rate downlink of the LCID is determined (S620).

Next, when exceeding in step S620, the last subframe among the N subframes is not allocated (S621). That is, the allocation of the N-th subframe is cancelled and (N−1) subframes form the first to the (N−1)-th subframes are allocated.

Next, the MBR allocation is checked with respect to the allocated LCID (S622). Whether scheduling is completed in step S619 may be verified based on whether the MBR allocation is checked.

Next, MSI is generated from the subframe allocated with the LCID and the packet of the LCID at the first allocation unit, and the subframe allocated with the LCID and the packet of the LCID at the second allocation unit (S629).

Next, whether packets of LCIDs not checked for a final allocation exists among the LCIDs all checked for the GBR allocation and the MBR allocation is determined (S623) at the third allocation unit.

Next, among the LCIDs all checked for the GBR allocation and the MBR allocation, the packets of the LCID not checked for the final allocation are sequentially allocated to subframes not allocated in step S619 (S624). After the allocation is completed in step 614 and step S619, the subframes are allocated with respect to the LCID packet not scheduled in step S624. Whether the allocation is performed in step S624 may be verified based on whether the final allocation is checked. Among the LCIDs all checked for the GBR allocation and the MBR allocation, the packets of the LCID not checked for the final allocation and having a high priority level is initially allocated to the subframe.

Next, the final allocation is checked with respect to the LCID allocated in step S624 (S625) at the third allocation unit.

Next, whether the LCID allocated in step S624 is the last allocated LCID is determined (S626).

Next, when the LCID allocated in step S624 is the last allocated LCID, whether a value obtained by dividing the number of bits of the subframe allocated last with the packet of the LCID by the TB of the subframe is less than the threshold value is determined (S627).

Next, whether the value is less than the threshold value in S627, the allocation of the last allocated subframe is cancelled (S628). That is, whether the LCID allocated in step S624 is the last allocated third LCID is determined. When the value obtained by dividing the number of bits occupying the last subframe of the last allocated LCID by the TB of the subframe is less than the threshold value, the allocation of the last allocated subframe is cancelled. When (number of bits allocated in the scheduled last subframe/TB size of the subframe)<$\alpha$ (here, 0<$\alpha$<1), the allocation of the last subframe is cancelled. A value of $\alpha$ as above may be arbitrarily predetermined by an operator and the efficiency of a wireless resource use rate increases according to an increase in the value of $\alpha$.

Next, MSI is generated from the subframes allocated with the LCID and the packet of the LCID at the first allocation unit, the subframes allocated with the LCID and the packet of the LCID at the second allocation unit, and the subframes allocated with the third LCID and the packet of the LCID at the third allocation unit (S629).

Next, the packets of the LCID allocated to the cancelled subframe is initially allocated in a subsequent MSP. Subframes not used in the MSP may be used for unicast transmission.

According to exemplary embodiments of the present invention, an eNB scheduling for a multi-cell transmission service may allocate wireless resources based on a priority level, a minimum guaranteed bit rate, and a maximum bit rate. That is, a subframe may be efficiently used by minimizing the number of subframes to be allocated to a single session while satisfying a QoS.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling apparatus considering a quality of service (QoS), comprising a processor configured to execute:
   a receiving module to receive a QoS parameter including at least one of a priority level, a multimedia broadcast multicast service (MBMS) E-RAB guaranteed bit rate downlink, and an MBMS E-RAB maximum bit rate downlink with respect to logical channel identifiers (LCIDs) from a multi-cell/multicast coordinate entity (MCE), and to receive packets of the LCIDs from a radio link control (RLC) based on an MBMS scheduling period (MSP) unit;
   a first allocation unit to sequentially allocate, to subframes, packets of a LCID not checked for a guaranteed bit rate (GBR) allocation, among the LCIDs having the MBMS E-RAB guaranteed bit rate downlink;
   a first schedule module including a first check unit to check the GBR allocation with respect to the LCID allocated by the first allocation unit; and
   an MBMS scheduling information (MSI) generation module to generate MSI from the subframe allocated with the LCID and the packets of the LCID.

2. The apparatus of claim 1, wherein the first allocation unit initially allocates the packets of the LCID having a high priority level.

3. The apparatus of claim 1, wherein the first schedule module further includes a first control unit to cancel an allocation of a last subframe among subframes allocated with the packets of the LCID.

4. The apparatus of claim 1, further comprising:
   a second allocation unit to sequentially allocate, to N subframes not allocated by the first allocation unit, packets of a LCID not checked for a maximum bit rate (MBR) allocation, among the LCIDs all checked for the GBR allocation and having the MBMS E-RAB maximum bit rate downlink; and
   a second schedule module including a second check unit to check the MBR allocation with respect to the LCID allocated by the second allocation unit,
   wherein the MSI generation module generates MSI from the subframe allocated with the LCID and the packets of the LCID at the first allocation unit, and the subframe allocated with the LCID and the packets of the LCID at the second allocation unit.

5. The apparatus of claim 4, wherein the second allocation unit initially allocates the packet of the LCID having a high priority level.

6. The apparatus of claim 4, wherein the second schedule module further includes a second control unit to cancel an allocation of an N-th subframe among the N subframes when a sum of the number of bits of (N−1)-th packets of the LCID allocated by the second allocation unit and the number of packet bits of the LCID that is allocated by the first allocation unit and is the same as the second LCID exceeds the MBMS E-RAB maximum bit rate downlink of the LCID.

7. The apparatus of claim 4, further comprising:
   a third allocation unit to sequentially allocate, to a sub frame not allocated by the second allocation unit, packets of a LCID not checked for a final allocation, among the LCIDs all checked for GBR allocation and the MBR allocation; and
   a third schedule module including a third check unit to check the final allocation with respect to the LCID allocated by the third allocation unit,
   wherein the MSI generation module generates MSI from the subframe allocated with the LCID and the packets of the LCID at the first allocation unit, the subframe allocated with the LCID and the packets of the LCID at the second allocation unit, and the subframes allocated with the LCID and the packet of the LCID at the third allocation unit.

8. The apparatus of claim 7, wherein the third allocation unit initially allocates the packets of the LCIDs having a high priority level.

9. The apparatus of claim 7, wherein the third schedule module further includes a third control unit to cancel an allocation of the last subframe when the LCID is allocated last by the third allocation unit, and a value obtained by dividing the number of bits of the last subframe, among subframes allocated with the packet of the LCID, by a transport block (TB) of the last subframe is less than a threshold value.

10. The apparatus of claim 9, wherein the packets of the third LCID allocated to the cancelled last subframe is initially allocated in a subsequent MSP.

11. A scheduling method considering a QoS, comprising:
(a) receiving a QoS parameter including at least one of a priority level, an MBMS E-RAB guaranteed bit rate downlink, and an MBMS E-RAB maximum bit rate downlink with respect to LCIDs from an MCE;
(b) receiving packets of the LCIDs from an RLC based on an MSP unit;
(c) sequentially allocating, to subframes, a packet of a first LCID not checked for a GBR allocation, among the LCIDs having the MBMS E-RAB guaranteed bit rate downlink;
(d) checking the GBR allocation with respect to the allocated LCID; and
(e) generating MSI from the subframe allocated with the LCID and the packets of the LCID at the first allocation unit.

12. The method of claim 11, wherein step (c) initially allocates the packets of the LCID having a high priority level.

13. The method of claim 11, further comprising:
cancelling an allocation of a last subframe among sub frames allocated with the packet of the LCID.

14. The method of claim 11, further comprising:
(i) sequentially allocating, to N subframes not allocated in step (c), a packet of a LCID not checked for an MBR allocation, among the LCIDs all checked for the GBR allocation and having the MBMS E-RAB maximum bit rate downlink at the second allocation unit; and
(g) checking the MBR allocation with respect to the LCID allocated in step (i), wherein step (e) generates MSI from the subframe allocated with the LCID and the packets of the LCID at the first allocation unit, and the subframe allocated with the LCID and the packet of the LCID at the second allocation unit.

15. The method of claim 14, wherein step (f) initially allocates the packet of the LCID having a high priority level.

16. The method of claim 14, further comprising:
cancelling an allocation of an N-th subframe among the N subframes when a sum of the number of bits of (N−1)-th packets of the LCID allocated in step (i) and the number of packet bits of the LCID that is allocated in step (c) and is the same as the LCID exceeds the MBMS E-RAB maximum bit rate downlink of the LCID.

17. The method of claim 14, further comprising:
(h) sequentially allocating, to a subframe not allocated in step (i), a packet of a LCID not checked a final allocation, among the LCIDs all checked for the GBR allocation and the MBR allocation at the third allocation unit; and
(i) checking the final allocation with respect to the LCID allocated in step (h),
wherein step (e) generates MSI from the subframe allocated with the LCID and the packets of the LCID at the first allocation unit, the subframe allocated with the LCID and the packets of the LCID at the second allocation unit, and the subframe allocated with the LCID and the packets of the LCID at the third allocation unit.

18. The method of claim 17, wherein step (h) initially allocates the packet of the LCID having a high priority level.

19. The method of claim 17, further comprising:
cancelling an allocation of a last subframe when the LCID is allocated last in step (h), and a value obtained by dividing the number of bits of the last subframe, among subframes allocated with the packets of the LCID, by a transport block (TB) of the last subframe is less than a threshold value.

20. The method of claim 19, wherein the packet of the LCID allocated to the cancelled last subframe is initially allocated in a subsequent MSP.

\* \* \* \* \*